United States Patent [19]

Yamakawa

[11] Patent Number: 4,848,876
[45] Date of Patent: Jul. 18, 1989

[54] ELECTRONIC CONTROL CIRCUIT FOR PREVENTING ABNORMAL OPERATION OF A SLAVE CONTROL CIRCUIT

[75] Inventor: Kiyoshi Yamakawa, Gifu, Japan

[73] Assignee: Brother Kogyo Kabushiki Kaisha, Japan

[21] Appl. No.: 180,324

[22] Filed: Apr. 11, 1988

[30] Foreign Application Priority Data

Apr. 22, 1987 [JP] Japan .................... 62-61248

[51] Int. Cl.$^4$ .............. G02F 1/13; G09G 3/36; H03K 3/01
[52] U.S. Cl. ................. 350/331 R; 350/332; 340/784; 340/813; 364/136; 364/184; 307/296.4; 307/38
[58] Field of Search .......... 350/332, 331 R; 340/764, 811, 812, 813, 765, 784; 307/600, 601, 602, 603, 604, 605, 296.1, 272 R, 272 A, 590, 592, 593, 594, 595, 596, 38, 29, 296.4, 318; 364/132, 136, 177, 184, 431.1

[56] References Cited

U.S. PATENT DOCUMENTS

| | | | |
|---|---|---|---|
| 3,787,752 | 1/1974 | Delay | 340/811 |
| 4,099,247 | 7/1978 | Mikada et al. | 340/811 |
| 4,139,278 | 2/1979 | Matsumoto et al. | 350/331 R |
| 4,309,701 | 1/1982 | Nishimura | 340/811 |
| 4,365,316 | 12/1982 | Iwahashi et al. | 307/296.1 |
| 4,713,659 | 12/1987 | Oyagi et al. | 340/765 |
| 4,748,444 | 5/1988 | Arai | 340/765 |

FOREIGN PATENT DOCUMENTS

| | | | |
|---|---|---|---|
| 0068027 | 6/1981 | Japan | 307/296.4 |
| 0168367 | 10/1982 | Japan | 364/136 |
| 0188706 | 10/1984 | Japan | 364/431.01 |
| 2094581 | 9/1982 | United Kingdom | 307/296.4 |

OTHER PUBLICATIONS

G. Hanchett, "Turn-On Reset Pulse Circuits" Technical Notes, a publication of RCA, Princeton, N.J., Apr. 1973.

Primary Examiner—John S. Heyman
Assistant Examiner—Huy Kim Mai
Attorney, Agent, or Firm—Oliff & Berridge

[57] ABSTRACT

In an electronic control system having a main CPU and a slave CPU which is under the control of the main CPU, a power control circuit is provided between the power source and the slave CPU to stop supplying power to the slave CPU until the main CPU starts normal operation when the power to the overall system is turned on. The slave CPU does not start operation until the main CPU becomes capable of normal operation and control over the slave CPU, which prevents unexpected action of the slave CPU and the subordinate control object. The power control circuit is also effective in preventing the abnormal action of the slave CPU when the power to the overall system is turned off.

8 Claims, 3 Drawing Sheets

ELECTRONIC CONTROL CIRCUIT FOR PREVENTING ABNORMAL OPERATION OF A SLAVE CONTROL CIRCUIT

BACKGROUND OF THE INVENTION

This invention relates to a power source controller for an electronic control circuit having a main control circuit and a slave control circuit which is under the control of the main control circuit.

In order to control a complex control object including many functional parts, such a structure is adopted where a slave control circuit is provided for each of the functional parts and a central main control circuit controls the slave control circuits. By this control system, the overall control of the complex system is simplified, designing labor is reduced and thus cost of the total control system is minimized.

But the existence of plural control circuits brings about a shortcoming especially at the power-on and power-off of the overall system. When the slave control circuit is under normal control of the main control circuit, the functional part corresponding to the slave control circuit is controlled normally by the main control circuit via the slave control circuit. But when the power to the overall control system is initially turned on and the slave control circuit becomes operable before the main control circuit becomes operable, the slave control circuit may do an unexpected abnormal action over the corresponding functional part depending on the transient state of the slave control circuit because the slave control circuit is not reset and initialized by the main control circuit. Also, at the time of power turn-off of the overall control system, if the main control circuit becomes inoperable before the slave control circuit becomes inoperable, the slave control circuit may produce an unexpected action. Such phenomena tend to occur when the minimum operable voltage of the main control circuit is higher than that of the slave control circuit. A further related problem is that, when the control object includes a motor, the inertial rotation of the motor just after the power to the overall system is turned off can generate power with low voltage which will produce an unexpected operation of the slave control circuit without causing operation of the main control circuit.

SUMMARY OF THE INVENTION

An object of the present invention is to assure normal control of the complex system at any time including the start-up and shut-off of the overall power supply to the system.

Another object of the invention is to prevent unexpected operation of the slave control circuit when the control system includes a main control circuit and a slave control circuit with a simple structure of a power supply control circuit.

Those and other objects are achieved by the present invention in which the electronic control circuit comprises: a power source; a main control circuit which is connected to the power source; a slave control circuit which is under control of the main control circuit add is connected to the power source; and a power control circuit provided between the power source and the slave control circuit for stopping power supply to the slave control circuit while a voltage level of the power source is lower than a predetermined value, the predetermined value being determined based on a minimum operable voltage of the main control circuit. According to the present invention, power supply to the slave control circuit is started after the main control circuit begins to operate normally.

BRIEF EXPLANATION OF THE DRAWINGS

The invention may be best understood by referring to the following description of the preferred embodiments and the drawings in which.

DETAILED DESCRIPTION OF THE PREFERRED EMBODIMENTS

Figure 1:
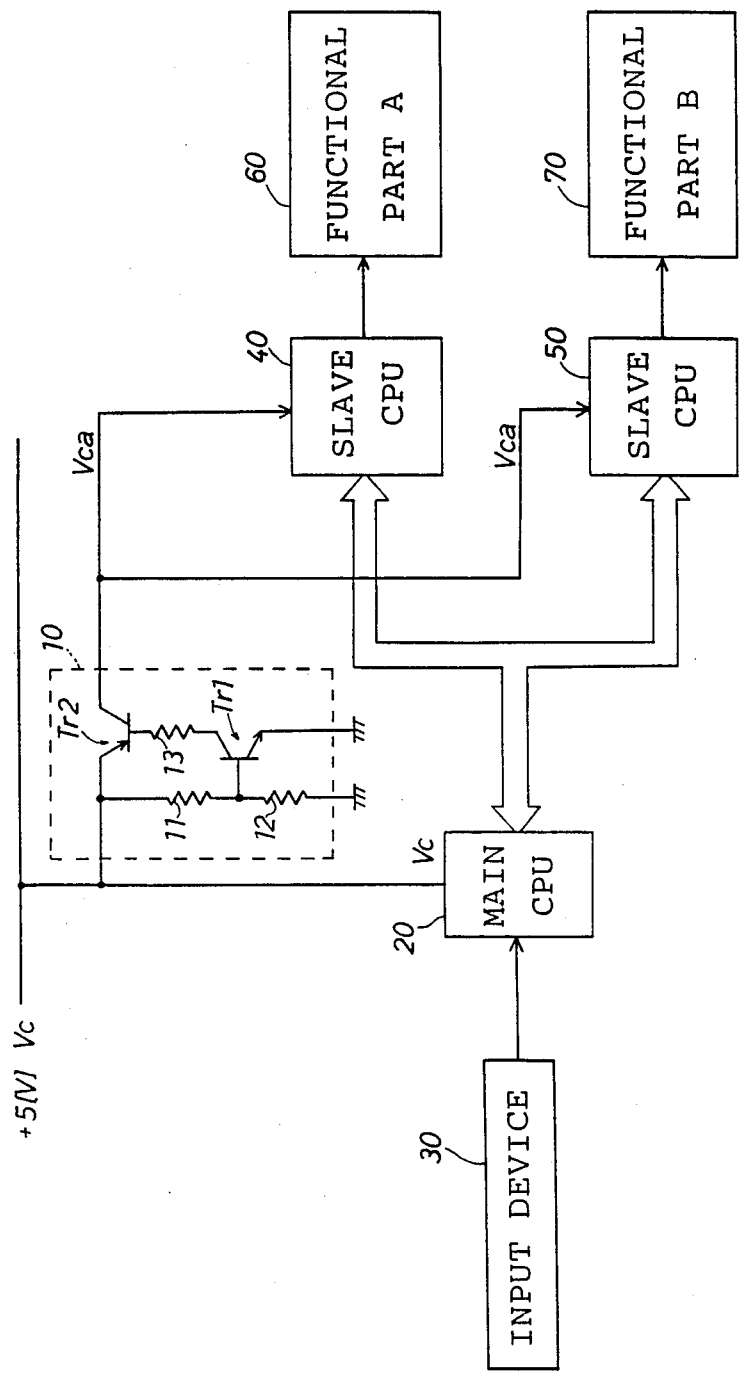
FIG. 1 is a circuit diagram of an electronic control circuit as an embodiment of the present invention.

Hereinafter, embodiments of the present invention will be described referring to the drawings. In FIG. 1, a main CPU (Central Processing Unit) 20, which constitutes the main control circuit, receives commands input by an operator from the input device 30 and decodes the commands to generate and output control signals to each of functional parts 60, 70 via respective slave CPU 40, 50, which constitutes the slave control circuit. Owing to the operations of the main CPU 20, every functional part 60, 70 can be controlled according to commands from the operator. The slave CPUs 40, 50 are reset by the main CPU 20 when they start their operation and decode further the control signals from the main CPU 20 to actually control the functional part A 60 and the functional part B 70. The main CPU 20 and the slave CPUs 40, 50 receive power from the same power source of +5 V (Vc), whereas the minimum operable voltage of the main CPU 20 is +4 V and that of the slave CPUs 40, 50 is +3 V.

Between the power source Vc and the slave CPUs 40, 50, a power control circuit 10 is provided which has the following structure. Two resistances 11, 12 are serially connected between the power source and the ground. The base of a first transistor Tr1 is connected to the junction of the two resistances 11, 12; the emitter of the first transistor Tr1 is grounded; and the collector of the first transistor Tr1 is connected to the base of a power transistor Tr2 via another resistance 13. The emitter and collector of the power transistor Tr2 are connected between the power source and the slave CPUs 40, 50 to switch the power to the slave CPUs 40, 50. The values of the two resistances 11, 12 are so determined that while the source voltage Vc is higher than 4.5 V, which is higher than the minimum operable voltage Vmin of the main CPU 20, the first transistor Tr1 is turned on. When the first transistor Tr1 is turned on, the power transistor Tr2 is also turned on and the power is supplied to the slave CPUs 40, 50.

Figure 2:
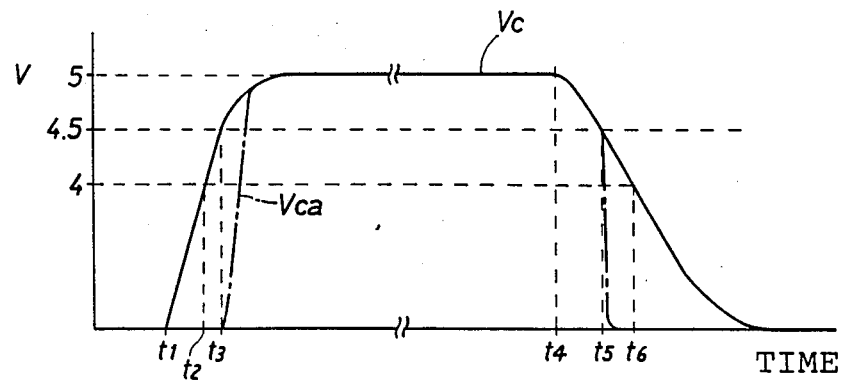
FIG. 2 is a timing chart for explaining the operation of the power control circuit of the embodiment.

Timing chart of FIG. 2 explains the operations of the power control circuit 10. When the power source to the overall electronic circuit is turned on at a time point t1, the voltage of the power source Vc starts to rise in a manner depending on the load of the power source. At this time, the power transistor Tr2 is still off and the voltage Vca on the line to the slave CPUs 40, 50 is zero. The source voltage Vc grows to exceed 4 V at a time point t2. From this time, the main CPU 20 starts its operation. When the source voltage Vc further rises to exceed 4.5 V at a time point t3, the first transistor Tr1 and the power transistor Tr2 are turned on and power supply to the slave CPUs 40, 50 is started.

The embodiment is thus constructed so that when the slave CPUs 40, 50 start their operation, the main CPU 20 has already started its operation and normally controls the slave CPUs 40, 50. Even though the minimum operable voltage of the slave CPUs 40, 50, 3 V in this embodiment, is lower than the minimum operable voltage of the main CPU 20, 4 V in this embodiment, unexpected operations of the slave CPUs 40, 50 at the time of switch-on are avoided.

When power is turned off at a time point t4 and the source voltage Vc falls below 4.5 V at a time point t5, the transistors Tr1 and Tr2 are turned off and the slave CPUs 40, 50 are first turned off before the main CPU 20. Then when the source voltage Vc falls below 4 V, the main CPU 20 stops its operation at a time point t6. This procedure assures control of the main CPU 20 over the entire system and avoids unexpected operations of the slave CPUs 40, 50 at the time of switch-off. Namely, the power control circuit 10 enables power supply to the slave CPUs 40, 50 only while the main CPU 20 can normally perform its control over the slave CPUs 40, 50. This eliminates the possibility of astray actions of the slave CPUs 40, 50 without control from the main CPU 20.

In the above embodiment, the values of the resistances 11, 12 are selected so that the threshold voltage for the switching of the slave CPUs 40, 50 is 4.5 V which is higher than the minimum operable voltage 4 V of the main CPU 20. Of course the values of the resistances 11, 12 may be determined so that the threshold voltage is 4 V.

In the above embodiment, two slave CPUs 40, 50 are provided under the main CPU 20. Of course, there may be more slave CPUs under a main CPU and further the invention is applicable to a case of plural main CPUs each having plural slave CPUs. In this case, similarly to the above explanation, the power control circuit 10 is so structured to supply power to the slave CPUs only when the main CPUs are capable of normal operation.

Figure 3:
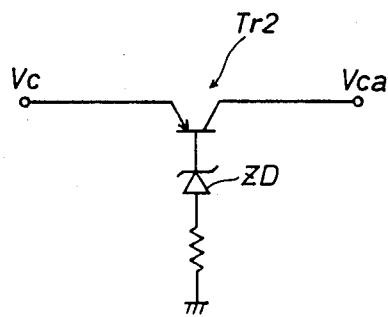
FIG. 3 is a circuit diagram of another power control circuit as a second embodiment of the invention.

Another example of the power control circuit as a second embodiment is here explained with reference to FIG. 3. Here a reference diode ZD is used in place of the first transistor Tr1 and the two resistances 11, 12 of the first embodiment to determine the threshold voltage. When the voltage Vc of the power source exceeds the characteristic voltage of the reference diode ZD, the power transistor Tr2 is turned on and the load voltage Vca, which is equal to the source voltage Vc, is applied to the slave CPUs.

Figure 4:
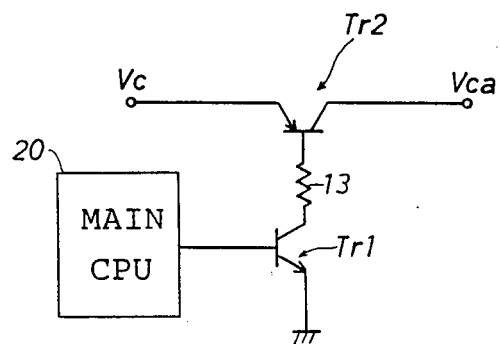
FIG. 4 is a circuit diagram of still another power control circuit as a third embodiment of the invention.

A further example as a third embodiment is explained with reference to FIG. 4. Here, the threshold voltage is determined by an output from the main CPU 20, instead of the two resistances 11, 12 of the first embodiment. Namely, the base of the first transistor Tr1 is connected to an output port of the main CPU 20. After the main CPU 20 starts its operation when the power to the overall system is turned on, the main CPU 20 changes the output from low to high at an appropriate time to switch the power transistor Tr2. By this sequence, it is assured that the operation of the slave CPUs always starts after the main CPU 20 stars its normal operation.

Figure 5:
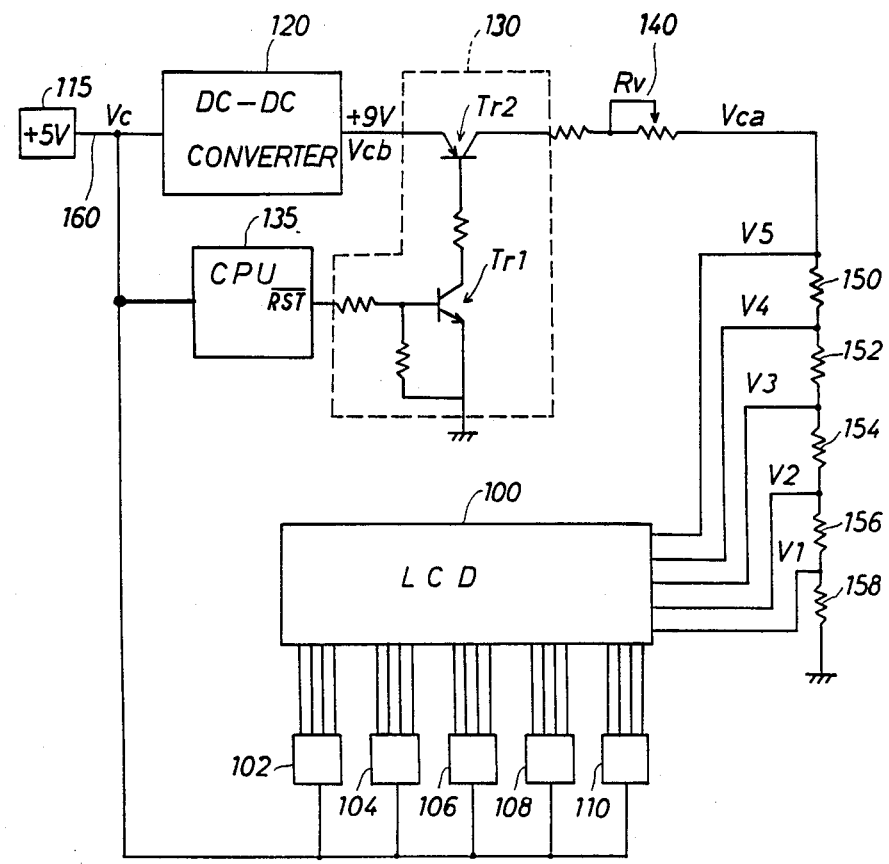
FIG. 5 is a circuit diagram of LCD control circuit as a fourth embodiment of the invention.

This invention is also applicable to a power control circuit of a Liquid Crystal Display (LCD) for preventing abnormal display when the power to the LCD is turned on or turned off. As shown in FIG. 5, an LCD 100 requires display drivers 102, 104, 106, 108, 110 for displaying figures on the screen. Each display driver 102, 104, 106, 108, 110 is connected to +5 V power source 115 of this LCD control system. The LCD 100 also requires driving power by itself. In this case, the LCD 100 needs power of five different voltages V1, V2, V3, V4, V5. As the voltage of the driving power of the LCD 100 needs to be higher than that of the power source 115 of the system, a DC-DC converter 120 is provided between the power source 115 and the LCD 100 to obtain +9 V power. Between the DC-DC converter 120 and the LCD 100, a power control circuit 130 is provided which is almost the same as that shown in FIG. 4. In this case, the base of the Tr1 is connected to a reset terminal of a CPU 135 controlling this LCD control system. After the power control circuit 130, a variable resistance 140 is provided to adjust contrast of the LCD screen and the source voltage is divided into the five voltages V1, V2, V3, V4, V5 required by the LCD 100 by means of resistances 150, 152, 154, 156, 158.

When the power source 115 is turned off, the output voltage Vcb of the DC-DC converter 120 decreases slower than the voltage Vc of the power source 115 due to the existence of the DC-DC converter 120. But for the power control circuit 130, a transient abnormal display appears on the screen of the LCD 100 because the display drivers 102, 104, 106, 108, 110 first become inoperative due to the quick decrease of the power source voltage Vc while the LCD 100 itself is operable due to comparatively slow decrease of the driving power voltage Vcb. In this embodiment, on the other hand, the supply voltage Vca of the LCD 100 decreases faster than the source voltage Vc when the power source 115 is turned off because the reset signal from the CPU 135 disconnects the connection between the DC-DC converter 120 and the LCD 100 faster than the decrease of the source voltage Vc. This prevents the abnormal display of the LCD 100 when the power is turned off. Of course, abnormal display at the time of power turned-on is also prevented. Further, even if noise or counter-electromotive voltage is generated on the power source line 160, no erroneous display occurs on the screen of the LCD 100 because the driving power to the LCD 100 is kept shut-off by the power control circuit 130.

Obviously, many modifications and variations of the present invention are possible in light of the above teachings. It is therefore understood that within the scope of the appended claims, the invention may be practiced other than as specifically described.

What is claimed is:

1. An electronic control circuit comprising:
   a power source;
   a main control circuit which is connected to the power source;
   a slave control circuit which is under control of the main control circuit and is connected to the power source; and
   a power control circuit provided between the power source and the slave control circuit for stopping supply of power to the slave control circuit when a voltage level of the power source is lower than a predetermined value, the predetermined value being based on a minimum operable voltage of the main control circuit.

2. An electronic control circuit according to claim 1 wherein the power control circuit (10) comprises a first switching transistor (tr1) and a second switching transistor (Tr2), the first switching transistor being provided for switching the second switching transistor depending on the predetermined value and the second switching transistor being provided on switching power supply to the slave control circuit.

3. An electronic control circuit according to claim 2 wherein the power control circuit (10) further comprises a first resistance (11) and a second resistance (12) both sequentially provided between the power source and a ground, the predetermined value being determined by the resistance values of the first and second resistances.

4. An electronic control circuit according to claim 2 wherein the predetermined value is determined by an output of the main control circuit.

5. An electronic control circuit according to claim 1 wherein the power control circuit (10) comprises a reference diode (ZD) and a switching transistor (Tr2), the reference diode being provided for determining the predetermined value by its threshold voltage value and the switching transistor being provided for switching power supply to the slave control circuit.

6. A liquid crystal display control circuit having a liquid crystal display (100) and a display driver (102, 104, 106, 108, 110) connected to the liquid crystal display, the liquid crystal display control circuit comprising:
   a power source (115) connected to the liquid crystal display and the display driver; and
   a power control circuit (130) provided between the power source (115) and the liquid crystal display (100) for stopping supply of power to the liquid crystal display (100) when a voltage level of the power source (115) is lower than a predetermined value, the predetermined value being based on a voltage below which the display driver is inoperable.

7. The liquid crystal display control circuit according to claim 6, wherein the power control circuit (130) comprises a first switching transistor (Tr1) and a second switching transistor (Tr2), the first switching transistor being provided for switching the second switching transistor depending on the predetermined value and the second switching transistor being provided for switching power supply to the liquid crystal display.

8. The liquid crystal display control circuit according to claim 7, wherein:
   the liquid crystal display control circuit comprises a CPU (135) connected to the power source and having a reset terminal; and
   the first switching transistor is switched by a signal from the reset terminal.

* * * * *